United States Patent
Hottner et al.

(10) Patent No.: US 10,710,345 B2
(45) Date of Patent: Jul. 14, 2020

(54) WATERPROOF AND WATER VAPOR PERMEABLE LAMINATE

(71) Applicants: W. L. Gore & Associates GmbH, Putzbrunn (DE); W. L. Gore & Associates (UK) Limited, West Lothian (GB)

(72) Inventors: Martin Hottner, Bruckmühl (DE); Gerry Mulligan, Edinburgh (GB)

(73) Assignees: W. L. Gore & Associates GmbH, Putzbrunn (DE); W. L. Gore & Associates (UK) Limited, West Lothian (GB)

( * ) Notice: Subject to any disclaimer, the term of this patent is extended or adjusted under 35 U.S.C. 154(b) by 212 days.

(21) Appl. No.: 15/506,126

(22) PCT Filed: Aug. 27, 2014

(86) PCT No.: PCT/EP2014/002347
§ 371 (c)(1),
(2) Date: Feb. 23, 2017

(87) PCT Pub. No.: WO2016/029922
PCT Pub. Date: Mar. 3, 2016

(65) Prior Publication Data
US 2018/0215130 A1    Aug. 2, 2018

(51) Int. Cl.
*B32B 27/12* (2006.01)
*B32B 5/02* (2006.01)
(Continued)

(52) U.S. Cl.
CPC .............. *B32B 27/12* (2013.01); *A41D 31/02* (2013.01); *A41D 31/102* (2019.02); *B32B 5/02* (2013.01);
(Continued)

(58) Field of Classification Search
CPC .. B32B 5/02; B32B 7/12; B32B 27/12; B32B 27/20; B32B 27/322; A41D 31/0016
See application file for complete search history.

(56) References Cited

U.S. PATENT DOCUMENTS

| 4,194,041 | A | 3/1980 | Gore et al. |
| 7,704,598 | B2* | 4/2010 | Jain .......................... A62D 5/00 |
| | | | 428/316.6 |
| 9,084,447 | B2* | 7/2015 | Johnson ................... B32B 27/12 |
| 2005/0048860 | A1 | 3/2005 | Ying et al. |
| 2007/0124849 | A1* | 6/2007 | Williams ........... A41D 19/0006 |
| | | | 2/275 |
| 2010/0104831 | A1* | 4/2010 | Kanagawa ......... C08G 18/4018 |
| | | | 428/198 |

(Continued)

FOREIGN PATENT DOCUMENTS

| EP | 0907507 B1 | 12/2002 |
| WO | WO-2009/033626 A1 | 3/2009 |

(Continued)

OTHER PUBLICATIONS

International Search Report and Written Opinion for Application No. PCT/EP2014/002347 dated Jan. 30, 2015.

*Primary Examiner* — Nicole M. Buie-Hatcher
(74) *Attorney, Agent, or Firm* — Greenberg Traurig, LLP (57) ABSTRACT

The present invention relates to a waterproof and water vapor permeable laminate, comprising: an first functional layer comprising a first water vapor permeable membrane; a second functional layer comprising a second water vapor permeable membrane; and a water vapor permeable intermediate textile layer arranged in between the first membrane and the second membrane and attached to the outer and inner functional layers in a water vapor permeable manner; the intermediate textile layer being hydrophobic.

22 Claims, 3 Drawing Sheets

(51) Int. Cl.
*B32B 27/32* (2006.01)
*B32B 7/12* (2006.01)
*A41D 31/02* (2019.01)
*A41D 31/102* (2019.01)
*B32B 27/20* (2006.01)

(52) U.S. Cl.
CPC ........... *B32B 7/12* (2013.01); *B32B 27/20* (2013.01); *B32B 27/322* (2013.01); *B32B 2255/26* (2013.01); *B32B 2262/0276* (2013.01); *B32B 2305/026* (2013.01); *B32B 2307/724* (2013.01); *B32B 2307/7246* (2013.01); *B32B 2307/73* (2013.01); *B32B 2437/00* (2013.01); *B32B 2437/02* (2013.01); *B32B 2437/04* (2013.01)

(56) References Cited

U.S. PATENT DOCUMENTS

| 2010/0288321 A1 | 11/2010 | Dwyer | |
| 2014/0087118 A1* | 3/2014 | Kronenberg | B32B 27/12 428/86 |
| 2015/0191856 A1* | 7/2015 | Hines | D02G 3/443 428/221 |

FOREIGN PATENT DOCUMENTS

| WO | WO-2009/042043 A1 | 4/2009 |
| WO | WO-2010/132083 A1 | 11/2010 |

* cited by examiner

WATERPROOF AND WATER VAPOR PERMEABLE LAMINATE

This application is a national stage of PCT/EP2014/002347, the entirety of which is incorporated herein by reference.

The present invention relates to a waterproof and water vapor permeable laminate, as used for waterproof and water vapor permeable functional garment. The present invention also relates to waterproof and water vapor permeable functional garment comprising such laminate.

In order to be waterproof, yet water vapor permeable, functional garment often comprises a laminate made up with a moisture vapor permeable membrane, e.g. a microporous expanded polytetrafluoroethylene (ePTFE) membrane. Such laminate may comprise an outer textile layer forming a shell. In order to reduce water-pick up, the outer textile layer may be provided with a water repellent finish, often referred as a DWR treatment (durable water repellent treatment). In conventional laminates, the water repellent finish allows low water pick-up rates in a brand new condition. However, it is well known that during use when the garment is subject to damage and/or contamination, water repellency is lost leading to wetting of the laminate and reduced comfort.

WO 2010/132083 A1 discloses a laminate having an outer functional layer and an inner textile layer attached to the outer functional layer. The outer functional layer forms the outer surface of a garment and comprises a moisture vapor permeable, microporous expanded PTFE membrane provided with a colorized outer film surface and/or an outer oleophobic coating. The inner textile layer is a woven or a knit made of polyester or polyamide and is laminated to the outer functional layer before or after the colorization/oleophobic coating step. The resulting laminate is described as being breathable, lightweight, durable, liquidproof, and having low water pick-up.

US 2010/0288321 A1 discloses a three layer laminate for producing a tent. The three layer laminate has a sandwich structure made up with an outer functional layer including a microporous ePTFE membrane, an inner functional layer including a microporous ePTFE membrane, and an intermediate textile layer laminated in between the outer functional layer and the inner functional layer. The intermediate textile layer is required to have flame retardant characteristics, and therefore made from a flame retardant material like polyaramide (Nomex). The outer functional layer may be subject to a colorization and/or oleophobic treatment. This laminate is described as being durably liquidproof, abrasion resistant, and oxygen permeable.

The present invention seeks to provide a water permeable laminate being durably waterproof, without impairing water vapor permeability.

The water vapor permeable laminate according to the invention comprises a first functional layer comprising a first water vapor permeable membrane; a second functional layer comprising a second water vapor permeable membrane; and a water vapor permeable intermediate textile layer arranged in between the first membrane and the second membrane and attached to the first and second functional layers in a water vapor permeable manner; the intermediate textile layer being hydrophobic. When used in a garment, the first functional layer may be adapted to form the outer layer or outer shell of the garment.

Such laminate allows to efficiently suppress water-pick up even in case the outer layer of the laminate is damaged in use of a garment. Each of the layers of the laminate contributes in different way to achieving good water repellency, low water-pick up, and waterproofness. Moreover, each of the layers is highly breathable, therefore even the sandwich structure made up from three layers allows for good water vapor permeability. The laminate suggested herein has the unique property of being durably low wet pick up even in the case when the outer layer is damaged or contaminated as the novel central hydrophobic layer rejects water entry and is protected over life by the inner and outer membranes while still being water vapor permeable.

Conventionally, in the industry hydrophobic coatings are used as a final treatment on the outer layer of a laminate to provide a DWR treatment which helps to repel water droplets impinging on the outer layer. Inherently with their hydrophobic characteristics, such DWR coatings also have a "non stick" character, which makes them very difficult to laminate. Nevertheless, the inventors supposed that if they could form a stable laminate with a hydrophobic inner textile layer, then the inner textile layer would repel water entering into the laminate in the case of damage of the outer layers, but still be very durable due to the protection provided by the outer layers. In normal use of garment, as an example, damage of the outer layers of the laminate comes from abrasion or small holes created by everyday contact with the environment. Such normal use damage, as well as further normal care procedures such as washing, cause normal water repellent DWR treatments to fail quickly, in some cases within a few weeks. In contrast, the laminate suggested herein is unexpectedly robust to such challenges.

A "membrane" as used herein is a thin barrier or film permeable to water vapor, but having waterproof characteristics. A membrane is considered to have waterproof characteristics in case the requirements specified in DIN EN 343 (2010) are met, i.e. a test of the liquid water resistance with respect to hydrostatic water pressure according to EN 20 811 (1992) yields a liquid water resistance $W_p$ of 8000 Pa, or more.

Particularly, the first functional layer may be made up by the first membrane exclusively. Similarly, the second functional layer may be made up by the second membrane exclusively. However, it is also conceivable that the first functional layer and/or the second functional layer have a more complex configuration comprising additional layers, coatings, or other elements. E.g. the first and/or second functional layers may include supporting layers, backing layers, or cover layers laminated to the first and/or second membranes, respectively, or may include additional coatings or fillers, respectively. The supporting layer, backing layer and/or cover layer may be textile layers. In particular embodiments of the laminate, the first and second membranes will be laminated to the intermediate textile layer directly, i.e. without interposing any additional layers. Then, the intermediate textile layer may perform the function of a reinforcing layer. Lamination as used herein generally refers to the superposition of two, or more, layers to each other, typically by use of a suitable adhesive or other bonding means. In particular embodiments, the first functional may form the outer layer of the laminate when used in a garment, while the second functional layer may be arranged on the inner side with respect to the first functional layer and the intermediate textile layer.

The first and second membranes may have a monolayer configuration, or may have a more complex configuration, e.g. a multi-layer configuration. The first and second membranes may be identical, but not necessarily need to be identical. For example, the first membrane may have a monolayer configuration, particularly a microporous monolayer configuration (for example the first membrane may be an expanded polytetrafluoroethylene membrane as taught in U.S. Pat. No. 3,953,566). The second membrane may have the same configuration as the first membrane. Better waterproofness of the laminate may be achievable if the second membrane has a twin layer configuration, e.g. the configuration of a microporous layer made from a first polymer coated with a monolithic layer made from a second polymer. Particularly, the second membrane may have the configuration of a microporous layer of expanded PTFE (as taught in U.S. Pat. No. 3,953,566) coated with a layer of monolithic hydrophilic polymer, as taught in U.S. Pat. No. 4,194,041. The hydrophilic polymer may be a hydrophilic polyurethane. Alternatively, other hydrophilic polymers may be conceivable, particularly polyether-polyester or a fluoropolymer.

The intermediate textile layer may have the configuration of a woven, knit, or non-woven, and may be made from natural or polymer fibers. The fibers may be monofilament fibers or multifilament fibers, and may be endless filament fibers or staple fibers. The textile may be made up of yarns composed of multiple fibers braided or twisted together.

The intermediate textile layer may be considered "hydrophobic" in the sense of the present invention in case any of the following condition applies: a) the intermediate textile layer shows water repellent characteristics; and b) the laminate shows non-wicking characteristics, according to test procedures defined herein. Non-wicking characteristics of the textile layer can be determined by subjecting the three layer laminate comprising the first functional layer, the intermediate textile layer, and the second functional layer to the Edge Wicking Test Protocol for the laminate edge area (EWTP) described herein. Water repellent characteristics of the textile layer can be determined by subjecting a semi-manufactured laminate comprising the textile layer attached to the first functional layer, but not comprising the second functional layer, to a Spraying Test Protocol for the surface of the intermediate textile layer (STP), as specified herein.

Furthermore, a laminate may be subject to the Water Pick-Up Rate Test Protocol (WPRTP) specified herein, in order to determine whether the laminate includes a textile layer having hydrophobic characteristics according to the present invention. The Water Pick-Up Rate Test Protocol WPRTP is based on the Bundesmann test according to DIN EN 29 865 (1993). When subject to the WPRTP test protocol, the first functional layer of the laminate is damaged as described herein, and the damaged laminate is subject to a Bundesmann Test as specified in DIN EN 29 865 (1993) an set out in more detail in the following. Assuming that in the damaged laminate water pick-up by the intermediate textile layer is significantly larger than water pick-up by the first and second functional layers, weight gain of the laminate in the Bundesmann Test reasonably approximates water pick-up by the intermediate textile layer. A not significant (no water weight gain or very low water weight gain) laminate weight gain according to the Bundesmann test indicates that the laminate includes a hydrophobic textile layer. In particular, a laminate, being prepared according to the Water Pick-Up Rate Test Protocol (WPRTP) specified herein and having a water pick-up rate of not more than 50 $g/m^2$ according to the Water Pick-Up Rate Test Protocol (WPRTP) specified herein might be considered to include a hydrophobic intermediate textile layer. In particular embodiments, laminates prepared according to the Water Pick-Up Rate Test Protocol (WPRTP) specified herein may have water pick-up rates of not more than 25 $g/m^2$ according to the Water Pick-Up Rate Test Protocol (WPRTP) specified herein; particularly of not more than 20 $g/m^2$; particularly between 5 $g/m^2$ and 45 $g/m^2$; particularly between 10 $g/m^2$ and 20 $g/m^2$. The values of the water-pick up rate specified herein particularly apply to the laminate being damaged as set out in Water Pick-Up Rate Test Protocol.

Hydrophobic characteristics of the intermediate textile layer may also be determined by subjecting a laminate comprising the first functional layer, the intermediate textile, and the second functional layer to the Edge Wicking Test Protocol (EWTP) specified herein, thereby testing wicking characteristics of the laminate. The Edge Wicking Test Protocol does not require a damaged laminate, and may be carried out using a brand new laminate. The laminate is cut such that one of the edges of the laminate is exposed showing the three layer structure of the laminate in cross section. The laminate is dipped into a water reservoir such as to cover the edge with the water. Assuming that the amount of water wicking into the intermediate textile layer will be significantly larger than the amount of water wicking into the first and second functional layer, weight gain of the laminate subject to the Edge Wicking Test Protocol (EWTP) is a good approximation of water pick-up by the intermediate textile layer. The laminate may be considered to have a hydrophobic intermediate textile layer in case the laminate shows a water weight gain of not more than 20% according to the Edge Wicking Test Protocol (EVVTP) specified herein. Particularly, laminates including hydrophobic textile layers may achieve a water weight gain of not more than 10% according to the Edge Wicking Test Protocol (EVVTP) specified herein; particularly of not more than 5%; in particular embodiments weight gain may be not more than 2%.

In order to determine water repellent characteristics of the intermediate textile layer, a semi-manufactured laminate may be provided. The semi-manfactured laminate includes the intermediate textile layer attached to any of the first functional layer and the second functional layer such that the intermediate textile layer is exposed on one of the surfaces of the semi-manufactured laminate. In such configuration the surface of the semi-manufactured laminate formed by the intermediate textile layer may be tested for its water repellency.

One method to determine water repellency of intermediate textile layer is subjecting the semi-manufactured laminate to a Spraying Test Protocol (STP) as specified herein. The Spraying Test Protocol (STP) is based on the procedures set out in DIN EN ISO 4920 (2012) for determining resistance to surface wetting of textile fabrics. The hydrophobic intermediate textile layer may be selected from a material showing, in a configuration of a semi-manufactured laminate comprising the intermediate textile layer and the first membrane, but not comprising the second membrane, a spray rate of at least 3 according to the Spraying Test Protocol (STP) specified herein; particularly a spray rate of 4 or more, particularly a spray rate of 5.

The laminate according to the invention may be waterproof. Waterproofness as used herein is defined according to the requirements set out in DIN EN 343 (2010) with respect to protective garment. According to DIN EN 343 (2010), a garment is considered to be waterproof in case it shows a resistance with respect to hydrostatic liquid water pressure $W_p$ (measured as set out in EN 20 811 (1992)) of at least 8000 Pa, and the same requirement applies to the laminate according to the invention. Particularly, the laminate may still be waterproof in a configuration with the outer functional layer being damaged, which requires that in a damaged condition as specified for the Water Pick-Up Rate Test Protocol specified herein, the hydrostatic liquid water pressure $W_p$ measured according to EN 20 811 (1992) still should be at least 8000 Pa. Waterproofness of the laminate may be tested by preparing the laminate as specified for the Water Pick-Up Rate Test Protocol (WPRTP), i.e. damaging the first functional layer, and subjecting the damaged laminate to the waterproofness test set out in EN 20 811 (1992).

Particular embodiments of a laminate according to the invention may even reach a resistance with respect to hydrostatic liquid water pressure $W_p$ of at least 10000 Pa, or even at least 13000 Pa, both in new condition and in damaged condition as set out for the WPRTP.

The intermediate textile layer may comprise a hydrophobic treatment known in the art as DWR (durable water repellent) treatment, and usually applied to provide an outer coating added to functional fabrics to make them water repellent. Methods for application of DWR treatments may involve applying a solution of a chemical, onto the surface of the fabric by spraying, padding, roll coating, or dipping. Chemistry may be applied in the vapor phase using Chemical Vapor Deposition (CVD) machinery. Suitable DWR treatments might be based on a fluorochemicals, e.g. as described in EP 2 381 031 A1; EP 1 583 615 B1, WO 96/38622 A1, or WO 2011/143370 A2. Other DWR treatments may include silicone based treatments, e.g. as disclosed in DE 10 2009 000 614 A1 or EP 0 312 949 A2, polyurethane based treatments, e.g. as disclosed in DE 10 2009 014 699 A1, polyolefine based treatments, e.g. as disclosed in EP 2 233 633 A2, EP 1 485 533 B1, or EP 1 268 919 B1; or even particle based treatments, e.g. as disclosed in DE 10 2006 053 326 A1 or EP 1 957 705 B1. All these DWR treatments may be used for providing a hydrophobic treatment to the intermediate textile layer in the laminate according to the present invention.

The first functional layer may be laminated to a first side of the intermediate textile layer via a water vapor permeable adhesive layer. The second functional layer may be laminated to an opposite side of the intermediate textile layer via a water vapor permeable adhesive layer. For example, the first functional layer may be discontinuously bonded to the intermediate textile layer and/or the second functional layer may be discontinuously bonded to the intermediate textile layer. The first functional layer may be arranged on the outer side of the intermediate textile layer and the second functional layer may be arranged on the inner side of the intermediate textile layer in a garment.

At least one of the first membrane and the second membrane may comprise a porous membrane, in particular a microporous membrane made from expanded polytetrafluoroethylene (ePTFE). Such membrane is described in U.S. Pat. No. 3,953,566.

Alternatively, at least one of the first membrane and the second membrane may comprise a monolithic membrane, in particular made from a hydrophilic polymer, like polyurethane and/or or polyether-polyester.

The first membrane may have a configuration different from the second membrane. In particular, a waterproof laminate may be provided by having at least one of the first and second membranes being waterproof. Therefore, it may be advantageous to make up the laminate using a second membrane being waterproof, and a first membrane having a lower resistance with respect to hydrostatic liquid water pressure, and hence not being considered waterproof according to the requirements of DIN EN 343 (2010). For example, the first membrane may be a porous membrane, in particular made from a hydrophobic material, having a resistance with respect to hydrostatic liquid water pressure of only at least 500 Pa, particularly of at least 1000 Pa. The second membrane may have the configuration of a porous membrane combined with a monolithic membrane or provided with a monolithic coating. The second membrane particularly may have the configuration of a microporous membrane made from a hydrophobic material, e.g. expanded polytetrafluoroethylene (ePPTFE) as described in U.S. Pat. No. 3,953,566 coated with a layer of hydrophilic monolithic material like polyurethane. Such membrane is described in detail in U.S. Pat. No. 4,194,041.

The first membrane may be a microporous membrane made from expanded polytetrafluoroethylene (ePTFE), as described in U.S. Pat. No. 3,953,566.

To achieve good water vapor permeability while still providing sufficiently waterproof characteristics over the full service life of a garment, it is preferable for the first membrane to have a mean flow pore size between 0.05 µm and 0.5 µm, particularly between 0.1 µm and 0.5 µm; particularly between 0.2 µm and 0.45 µm. A particularly preferred a porous size for the first membrane is about 0.2 µm.

The laminate may have a Moisture Vapor Transmission Rate (MVTR) according to DIN EN ISO 15496 (2004) of at least 3000 g/(m²24 h); particularly of at least 6000 g/(m²24 h); particularly of at least 8000 g/(m²24 h); particularly between 3000 and 20000 g/(m²24 h). In particular, MVTR may be within the ranges given over the full service life of a garment made up with the laminate, e.g. in a configuration where the first functional layer is damaged as specified for the WPRTP.

In some embodiments, at least one further textile layer attached to a side of the second functional layer opposite to the intermediate textile layer. Typically, in a garment the further textile layer will be on the inner side of the inner functional layer. The further textile layer may have any configuration as used for providing a backing layer or lining.

In further embodiments, the first functional layer may be on the outer side of the intermediate textile layer in a garment, and the outer functional layer may be provided with a colorant on the outer side. Examples for such colorant are described in WO 2010/132083 A1 and US 2010/0288321 A1.

In the addition to the above, the first functional layer may be provided with an additional monolithic and/or hydrophobic coating on the surface opposite to the intermediate textile layer.

In particularly preferred embodiments, the waterproof and water vapor permeable laminate may comprise: An outer functional layer comprising a first water vapor permeable microporous ePTFE membrane; an inner functional layer comprising a second water vapor permeable microporous ePTFE membrane; and a water vapor permeable intermediate textile layer arranged in between the first membrane and the second membrane and attached to the first and second membranes in a water vapor permeable manner; the intermediate textile layer being hydrophobic.

A garment comprising the laminate according to the invention may be any of outerwear, underwear, footwear, glove, headwear, and accessories. In such garment, the outer functional layer may form the outermost side of the garment.

The invention will be described in more detail hereinafter with reference to particular embodiments, test procedures and examples:

Figure 1:
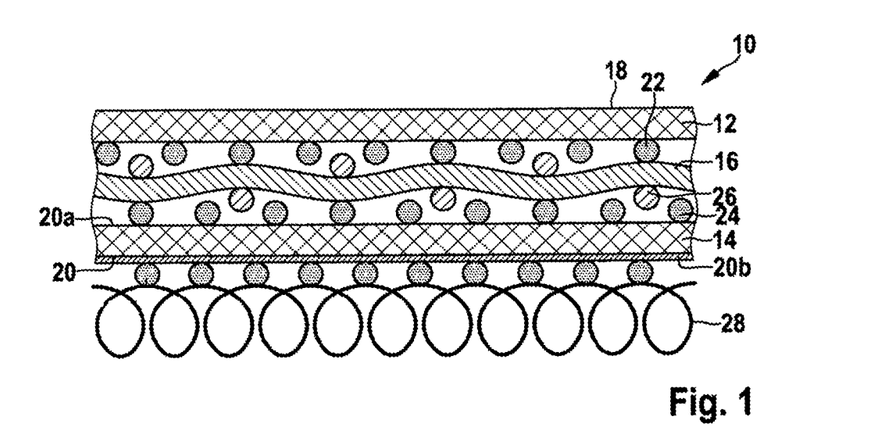
FIG. 1 shows a simplified schematic cross section of a laminate according to an embodiment in new condition.

FIG. 1 shows a simplified schematic cross section of a laminate 10 according to an embodiment. The laminate includes a first functional layer 12, a second functional layer 14, and an intermediate textile layer 16. In the embodiment, the first functional layer 12 forms an outer functional layer of the laminate 10, and the second functional layer 14 forms an inner functional layer of the laminate 10. The first functional layer 12 in the embodiment shown is formed by a first water vapor permeable membrane 18. The second functional layer 14 in the embodiment is formed by a second water vapor permeable membrane 20. In the embodiment shown the first water vapor permeable membrane 18 has the configuration of a microporous membrane made of a hydrophobic material, in particular expanded PTFE as taught in U.S. Pat. No. 3,953,566. Further, in the embodiment the second water vapor permeable membrane 20 is water vapor permeable and waterproof. For example, the second water vapor permeable membrane 20 may have the configuration of a microporous layer made from a hydrophobic material, in particular made from expanded PTFE as taught in U.S. Pat. No. 3,953,566, forming a base layer 20a. The base layer 20a is coated with a monolithic coating 20b made from a hydrophilic material, in particular made from hydrophilic polyurethane, as taught in U.S. Pat. No. 4,194,041.

The first and second membranes 18, 20 are laminated to respective opposite sides (in FIG. 1, to the outer and inner sides) of the intermediate textile layer 16 by respective discrete patterns of adhesive 22, 24.

The intermediate textile layer 16 may have the configuration of any of a woven, a knit, or a non-woven. The term "woven" may include any textile structure made up with weft and warp yarns or filaments. The term "knit" is to be understood broadly, in particular including any forms of warp knits and circular knits, but also covering any other configurations where a textile structure is produced by wrapping one or more yarns or filaments such as to form loops. Thus, a knit as used herein may also cover configurations that might be referred to as braided structures. The intermediate textile layer may be made from natural or synthetic fibers, in particular from polyester, polyamide, or mixtures thereof.

The intermediate textile layer has hydrophobic characteristics. Depending on the material from which the intermediate textile layer is made of, it may have intrinsically hydrophobic characteristics. More preferable, the intermediate textile layer 16 is rendered hydrophobic by a water repellent or hydrophobic treatment, as indicated by the reference numeral 26. The water repellent or hydrophobic treatment may in particular be a durable water repellent treatment (DWR), as known for outer coatings of functional garment.

A backing layer 28, in the example shown made of knit textile, is attached to the inner side of the inner functional layer 14. Suitable materials of the backing layer may include any of polyester, polyamide, aramide, viscose cotton, or mixtures thereof. The backing layer 28 may have the configuration of any of a knit, a woven, or a non-woven.

Figure 2:
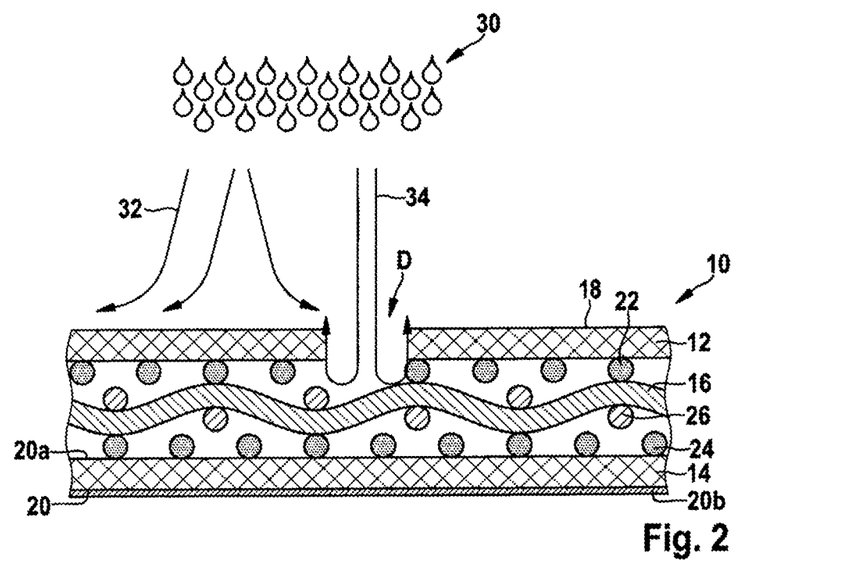
FIG. 2 shows a simplified schematic cross section of a laminate according to an embodiment in damaged condition.

While FIG. 1 shows a cross section of the laminate 10 in brand new condition, FIG. 2 shows a simplified schematic cross section of laminate 10 according to an embodiment, in a condition where the first functional layer 18 is damaged at one position indicated by "D" in FIG. 2. The laminate 10 of FIG. 2 has the same configuration as the laminate 10 according to FIG. 1, except that no backing layer 28 is provided. FIG. 2 schematically indicates what happens to water droplets 30 when impinging onto the surface of the first functional layer 18. In regions where the first functional layer 18 is undamaged, water droplets 30 will be rejected by the first functional layer 18 and thus cannot penetrate into first functional layer, as indicated by arrows 32 in FIG. 2. However, in regions where the first functional layer 18 is damaged (as indicated in region "D" in FIG. 2), water droplets may penetrate first functional layer 18 and enter into the laminate 10. Droplets having passed first functional layer 18 will contact the intermediate textile layer 16, as indicated by arrows 34 in FIG. 2. Due to the hydrophobic characteristics of intermediate textile layer 16, water droplets 34 contacting the intermediate textile layer 16 will be rejected by intermediate textile layer 16. Thereby, intermediate textile layer 16 suppresses further penetration of droplets 34 into the laminate. Hydrophobic character of the intermediate textile layer 16 and intimate contact between intermediate textile layer 16 and first functional layer hinders droplets 34 from spreading along the lateral extension of intermediate textile layer 16. As a result, droplets 34 will be rejected back through the damaged region towards the outer side of the laminate, as indicated by the reversing tips of arrows 34. Due to such mechanism, laminate 10 remains waterproof even in damaged condition.

Although not shown explicitly in FIG. 2, also the laminate of FIG. 2 may be provided with a backing layer 18 as described with respect to FIG. 1. Such backing layer is optional, for both laminates according to FIGS. 1 and 2.

Test Procedures

Water Pick-Up Rate Test Protocol (WPRTP):

The Water Pick-Up Rate Test Protocol (WPRTP) is based on the Bundesmann Test according to DIN EN 29 865 (1993) and determines the water absorption properties of textile structures using a rain test as specified in DIN EN 29865 (1993). The Bundesmann Test uses a rain unit which creates rain defined by water volume, drop size and distance of rain unit to test samples. The test runs for 10 minutes.

The rain unit comprises a droplet forming unit producing about 300 droplets of same size by respective droplet forming elements (e.g. nozzles) spread over a circular horizontally extending region covering an area of about 1300 $cm^2$ and having a diameter of 406 mm. Each of the droplets formed should have a diameter of about 4 mm and a volume of about 0.07 ml when leaving the respective droplet forming element.

For performing the test, the rain unit sprinkles water droplets with a total flow rate of 100 ml water per minute over the sample area, based on a sample area of 100 $cm^2$. For smaller or larger sample area, the flow rate is adjusted accordingly, e.g. for the case of a sample area of 80 $cm^2$ the flow rate will be 80 ml water per minute. The droplets fall from a height of 1500 mm from the droplet forming elements to sample area.

The rain test is carried out using water which has been purified from coarse impurities and has a temperature of 23° C. (relative humidity 65%).

Samples to be tested are inserted into a cup shaped fixture such as to form a lid of the cup shaped fixture. The fixture has an outer diameter of 100 $cm^2$, and allows for a free area of 80 $cm^2$ of each sample. Free area means the area of the sample being unsupported by the fixture when the sample is inserted into the fixture. For avoiding stagnation of water on the surface of the sample, the longitudinal axis of the fixture is slanted by 15° with respect to the vertical during measurement, so that the surface of the sample is slanted by 15° with respect to the horizontal direction.

For further details of the test apparatus and test procedure, reference is made to DIN EN 29 865 (1993).

Sample Preparation:

The measurement of the water absorption according the Water Pick-Up Rate Test Protocol is carried out on laminate samples according to the invention and on comparative laminate samples. The samples are tested in new condition and in damaged condition. Each sample has a circular shape with a diameter of 140 mm and is inserted into the fixtures described above, such that an area of 80 cm² remains free above the cup.

Preparation of New Samples:

Sample preparations follows the procedures specified in DIN EN 29 865 (1993).

Preparation of Damaged Samples:

The membrane of the outer functional layer (=first membrane) is scratched with a needle such as to create a linear scratch pattern. The needle has a diameter of 0.65 mm with a tip angle of 20 degrees and a tip radius of 50 micrometer resulting in individual linear scratch patterns.

The needle may be operated by hand at a speed of roughly ~0.3 m/s and an angle of roughly ~60° to the surface of the sample. Pressure is applied to the needle such that the first membrane is fully scored and the intermediate textile layer becomes visible. Damage of the intermediate textile layer should be avoided as far as possible. Scratching yields a pattern of parallel scratch lines where the intermediate textile layer becomes visible. The scratch lines extend over the sample with a distance of 30 mm between adjacent scratch lines.

Rain Test Procedure:

The water absorption of the fabric and laminate are measured according to the following method:
1. Determination of the weight of the sample (fabric/laminate) before starting the Bundesmann Test procedure
2. Performing the Bundesmann rain test procedure for 10 minutes
3. Spinning of the sample for 15 s
4. Determination of the weight of the sample
5. Calculation of the weight gain in % related to the sample before the Bundesmann rain test procedure.

Figure 3:
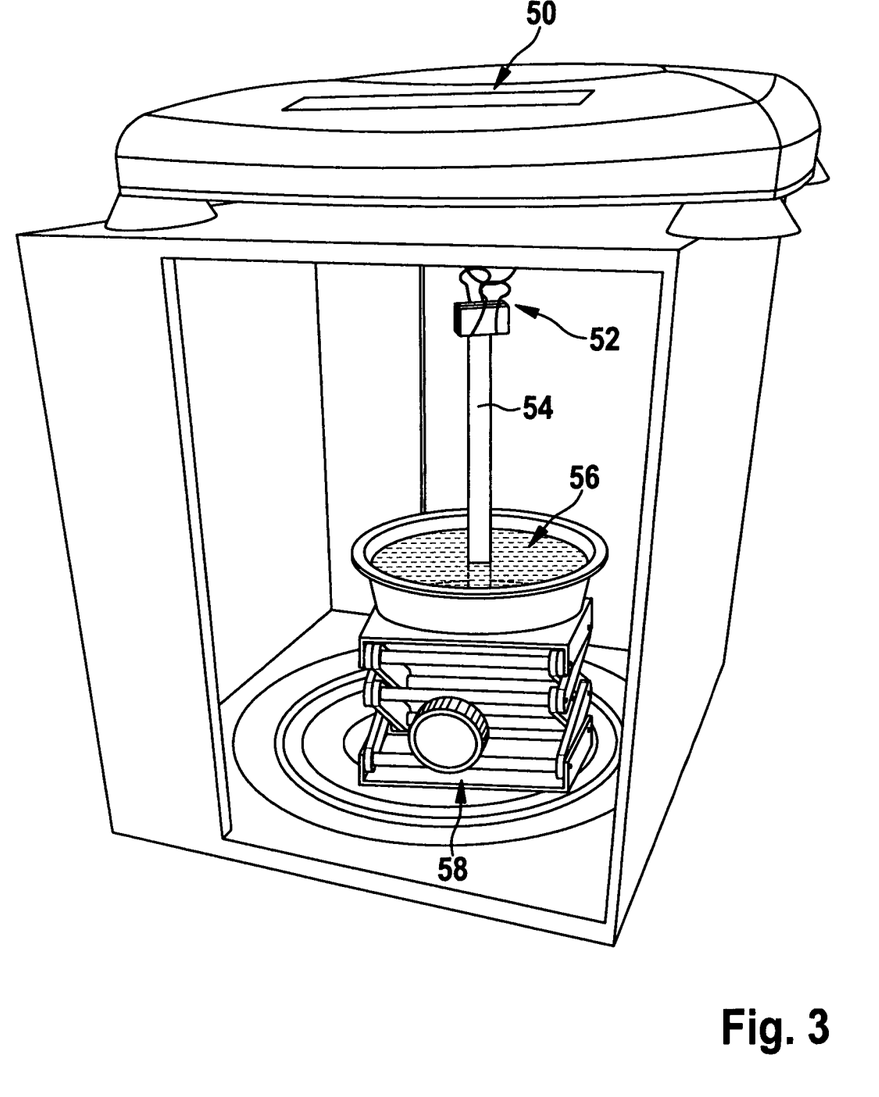
FIG. 3 shows a simplified schematic diagram of the test setup used in the Edge Wicking Test Protocol.

Edge Wicking Test Protocol (EWTP):

FIG. 3 shows a simplified schematic diagram of the test setup used in the Edge Wicking Test Protocol (EVVTP). The EWTP measures wicking characteristics of a freshly cut edge of the laminate. For carrying out the EWTP, a sample is cut from a laminate such as to yield at least one linear edge where the three layer sandwich comprising first functional layer/intermediate textile layer/second functional layer is exposed. The linear edge of the laminate is immersed in liquid water for a predetermined time. The absorption of water by the laminate is determined by detecting the increase in weight of the laminate resulting from water being absorbed by the laminate during that time. Assuming that water absorption by the intermediate textile layer is significantly larger than water absorption by the first and second functional layers, the increase in weight of the laminate detected during the EWTP is a good measure for testing the wicking characteristics of the intermediate textile layer, i.e. the capability of the intermediate textile layer to absorb or take up water.

For an intermediate textile layer having hydrophobic characteristics as suggested herein, when subject to the EWTP increase in weight should be below a threshold as indicated herein.

As can be seen in FIG. 3, the test equipment for carrying out the EWTP basically comprises a precise scale 50, and a suspension arrangement 52 for suspending a sample 54 to the scale in such a manner that weight of the sample, particularly any changes in weight of the sample during the test procedure, can be measured. Moreover, the test equipment comprises a water reservoir 56 which is filled with deionized liquid water at a temperature of 23° C. The water reservoir 56 should have a size of at least 50 cm² and a depth of at least 10 mm, in order to avoid significant change in the level of the water in the reservoir when water is sucked up by the sample after immersing in the water. The water reservoir 56 is placed on a platform 58 which can be lifted or lowered, such that the height of the water reservoir 56 can be adjusted during the test procedure.

The scale should have a precision of 10 mg, as a minimum.

Sample Preparation:

Two stripes are cut out from a sample laminate to be tested. Each stripe has 50 mm width and 120 mm length. For a woven intermediate textile layer, width and length direction of the sample are selected in in warp and weft direction, respectively. For other intermediate textile layers, e.g. a knit textile layer or a non-woven textile layer, width and length direction of the sample are also selected in directions corresponding to warp and weft directions as far as applicable.

The two sample stripes are rolled such as to form a sample 54 in the configuration of a spiralled cylinder. The two samples 54 are overlaid onto each other, and the longitudinal ends of one side of the samples 54 are clamped in a clip and hanged into the suspension arrangement 52 of the scale 50, as indicated in FIG. 3. In such configuration, the two samples 54 are suspended vertically from the scale 50 with their lower edges exposed. The weight of both sample stripes together is measured in dry condition of the sample stripes.

Then, the water reservoir 56 is filled with deionized water (temperature 23° C.) and placed on height adjustable platform 58. The water reservoir 56 is placed below the lower edges of the samples 54, without immersing the lower edges of the samples 54 in the water yet.

Measurement Procedure:

The water reservoir 56 is lifted until the lower edge of each of the samples 54 is immersed in the water by 5 mm. The lower edges of both samples 54 should immerse in the water simultaneously. At the time the lower edges of the samples 54 come into contact with the water and are immersed in the water, the scale is reset, a timer is reset and the timer clock is started.

After lapse of 5 minutes, the scale is read and the weight of the samples 54 is measured from the scale and noted.

The weight gain of the two sample stripes with respect to the weight of the two sample stripes in dry condition is determined and noted as a relative value in % with respect to the weight of the two sample stripes in dry condition.

Sample preparation and measurement procedure set out above are carried out at a temperature of 23° C. and a relative humidity of 65%.

Spraying Test Protocol (STP):

The Spraying Test Protocol (STP) corresponds to the procedures for testing set out in DIN EN ISO 4920 (2012) which discloses a detailed description including schematic diagrams of the test setup.

The test setup includes a spraying device including a vertically oriented cone having a maximum diameter at its upper end of 150 mm. A spray nozzle made from metal is attached to the lowermost section of the cone via a rubber pipe having an inner diameter of 10 mm. The upper end of the cone has a distance of 195 mm to the lower edge of the spraying nozzle. The metal spray nozzle has 19 openings each having a diameter of 0.86 mm. The openings are evenly distributed over the nozzle area, one nozzle forming the center of the nozzle arrangement defining a vertical axis of the test setup, 6 nozzles evenly distributed along a first circle with diameter of 10 mm around the central nozzle, and 12 nozzles evenly distributed along a second circle with diameter of 21 mm around the central nozzle. For testing, the cone is filled with a predetermined volume of 250 ml water. The test setup lead to a time of about 25 to 30 seconds required for the water passing the nozzles.

Measured samples are inserted in circular sample holders of 155 mm diameter each. The sample holders are placed on a platform positioned with an angle of 45° with respect to the horizontal. Sample holders with samples are placed centrally with respect to spray nozzle.

Deionized water at a temperature of 23° C. is used.

For testing, the cone is filled with 250 ml of deionized water and the sample is subject to rain continuously for 25 to 30 seconds. Then, the sample is taken from the sample holder and any superfluous water is removed by shaking, as set out in DIN EN ISO 4920 (2012).

Then, the surface of the sample on the side exposed to the rain is inspected visually according to the following criteria:

Spray rate 0: Sample is wetted on its side exposed to the rain over the complete sample area.
Spray rate 1: Sample is wetted on its side exposed to the rain in a contiguous region covering those points where rain drops contact sample surface.
Spray rate 2: Sample is wetted on its side exposed to the rain only locally in regions extending around points where rain drops contact sample surface.
Spray rate 3: Sample is wetted on its side exposed to the rain only at contact points where rain drops contact sample surface.
Spray rate 4: Sample is principally not wetted on its side exposed to the rain. Only occasionally small droplets remain in contact with the surface, however there is no clear correlation to the contact points where liquid rain drops contact the sample.
Spray rate 5: No droplets are visible on sample on its side exposed to the rain.

Moisture Vapor Transmission Rate Test Protocol (MVTR):

MVTR is measured according to DIN EN ISO 15496 (2004). As this is a standard test used in the textile industry, reference is made to the detailed description of the MVTR test disclosed in DIN EN ISO 15496 (2004). For a description of the MVTR test, see also WO 90/04175 A1.

The basic principles are summarized below:

The sample to be tested together with a highly water vapor permeable, but waterproof microporous membrane is inserted in an annular sample support. Then, the support is immersed in water for 15 minutes (deionized water at 23° C.) such that the membrane contacts the water. A cup is filled with a saturated solution of potassium acetate in water such as to produce a relative humidity of 23% at the surface of the sample and is covered with a second piece of the same waterproof microporous membrane. The cup including the potassium acetate solution and the second membrane is weighed and then placed on top of the sample support such that the second membrane contacts the sample. This leads to a transfer of water vapor through the sample from the side of the water into the cup with the potassium acetate. After 15 minutes, the cup with the potassium acetate is removed and its weight is determined. The same procedure is carried out with the first and second membranes, but without the sample, in order to determine moisture vapor permeability of the test setup without the sample. Then, the MVTR of the sample can be determined from the difference of both measurements, also considering the influence of the two additional microporous membranes.

The moisture vapor transmission rate (MVTR) of the laminate according to the invention was measured in accordance with EN ISO 15496 (2004) and is expressed in $g/(m^2\ 24\ h)$. In order to be considered as water vapor permeable as used herein, the laminate should generally have a water vapor permeability of at least 3000 $g/(m^2\ 24\ h)$, preferably at least 8000 $g/(m^2\ 24\ h)$ and more preferably at least $g/(m^2\ 24\ h)$. MVTR values may be as high as 20000 $g/(m^2\ 24\ h)$.

Waterproofness Test Protocol

Measurement of the water proofness is carried out in accordance with EN 20811 (1992). Also this test is a standard test used in the textile industry, and therefore reference is made to the detailed description of the test disclosed in EN 20811 (1992), which corresponds to International Standard ISO 811.

The principle of the test is to expose the sample to be tested to a hydrostatic water pressure and to find out the hydrostatic water pressure where water penetrates the sample for the first time. The sample is subject to a steadily increasing liquid water pressure on one side thereof, and it is determined at which static water pressure water penetrated the sample at three locations. This water pressure is noted as the liquid water resistance in terms of column of water (in mm). Depending on the test setup used, the liquid water pressure may act on the sample from above the sample of from below the sample.

A sample is considered waterproof in case the requirements set out in DIN EN 343 (2010) for waterproofness of protective garment are met. DIN EN 343 (2010) specifies a liquid water resistance of at least 8000 mm water, in particular cases (class 3) a liquid water resistance of at 13000 mm water. The laminates according to the invention meet the requirement of a liquid water resistance of at least 8000 mm water both in brand new condition and in a condition with samples damaged as set out above for the WPRTP. Some embodiments even achieve a liquid water resistance of at least 13000 mm water both in brand new and in damaged condition.

Mean Flow Pore Size Test Protocol:

Mean flow pore size is measured using the Coulter porosimeter as described e.g. in U.S. Pat. No. 4,718,270.

EXAMPLES

Comparative Example 1

A two layer intermediate laminate was provided which comprises a coated ePTFE membrane made from expanded polytetrafluoroethylene, hereafter referred to as ePTFE, coated with a continuous layer of water vapor permeable hydrophilic polyurethane, as described in U.S. Pat. No. 4,194,041. The coated ePTFE membrane forms the first functional layer.

The two layer intermediate laminate further includes a woven textile with a textile weight of 175 g/m² and made of polyester multifilaments. The woven textile was laminated to the ePTFE side of the coated ePTFE membrane by gravure printing a dot pattern of moisture curable polyurethane adhesive as described in U.S. Pat. No. 4,532,316. The adhesive printed side of the ePTFE membrane was pressed to one side of the woven textile in a nip role and then passed over a heated roll to form a two layer laminate. The moisture cure adhesive was allowed to cure for 48 hours.

Furthermore, the two layer intermediate laminate was subject to the Spraying Test Protocol (STP) specified herein. The textile side of the intermediate laminate showed a spray rate of 0 according to DIN EN ISO 4920(2012).

A further membrane made of ePTFE was laminated to the textile side of the two layer intermediate laminate. The further membrane was a microporous membrane produced from PTFE resin processed into an expanded microporous polytetrafluoroethylene (ePTFE) membrane according to the teaching of U.S. Pat. No. 3,953,566. The membrane was provided with an additional oleophobic coating as taught in U.S. Pat. No. 6,261,678 B1. The further membrane had a weight of 20 g/m², a thickness of 19 μm, a density of 0.97 g/cm³ and a mean flow pore diameter of 0.113 μm. The further membrane was water vapor permeable with a MVTR of 80 000 g/(m² 24 h).

The further membrane was laminated to the textile side of the two layer intermediate laminate by gravure printing a dot pattern of moisture curable polyurethane adhesive as described in U.S. Pat. No. 4,532,316. The adhesive printed side of the further membrane was pressed to the textile of the two layer laminate in a nip role and then passed over a heated roll to form a three layer laminate. The moisture cure adhesive was allowed to cure for 48 hours.

The resulting three layer laminate had a weight of 248 g/m².

The laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water, and even exceeded 13000 mm liquid water, both in new condition and in damaged condition, indicating the laminate was waterproof both in new condition and in damaged condition. MVTR exceeded 8000 g/(m² 24 h) indicating the laminate was vapor permeable.

The laminate was further tested according to the Edge Wicking Test Protocol (EWTP) specified herein and the Water Pick-Up Rate Test Protocol (WPRTP) specified herein. The results are summarized in Table 1. Water Pickup Rate in new condition was 10 g, but increased to 242 g in damaged condition. The EWTP resulted in a an increase of weight of about 29.7% with respect to the laminate before immersing in water due to wicking of water into the intermediate textile layer at the edge of the laminate.

Example 1

Another sample of the two layer intermediate laminate described above with respect to comparative example 1 was provided. The textile side of that sample was rendered hydrophobic by applying a DWR treatment based on a water repellent aqueous base coating of water repellent C6 fluoroacrylate chemical, as described in EP 2 381 031 A1 and available by the company Clariant AG, Germany under the name "Nuva 2114".

The two layer intermediate laminate with the water repellent treatment was subject to the Spraying Test Protocol (STP) specified herein. The textile layer rendered hydrophobic showed a sprayrate of 5 according to DIN EN ISO 4920(2012).

The two layer intermediate laminate including the hydrophobic treatment had a weight of around 220 g/m².

A two layer laminate as described above is commercially available under the name "Benbecula, 2L", article # BENB000000K by W.L. Gore & Associates, Inc. Such laminate was used as the intermediate laminate in example 1.

A further membrane made of ePTFE was laminated to the two layer intermediate laminate on the side of the DWR treated textile layer. The further membrane was a microporous membrane produced from PTFE resin processed into an expanded microporous polytetrafluoroethylene (ePTFE) membrane according to the teaching of U.S. Pat. No. 3,953,566. The membrane was provided with an additional oleophobic coating as taught in U.S. Pat. No. 6,261,678 B1. The membrane had a weight of 20 g/m², a thickness of 19 μm, a density of 0.97 g/cm³ and a mean flow pore diameter of 0.113 μm.

The further membrane was laminated to the textile side of the two layer laminate by gravure printing a dot pattern of moisture curable polyurethane adhesive as described in U.S. Pat. No. 4,532,316. The adhesive printed side of the further membrane was pressed to the textile of the two layer laminate in a nip role and then passed over a heated roll to form a three layer laminate. The moisture cure adhesive was allowed to cure for 48 hours.

Figure 4:
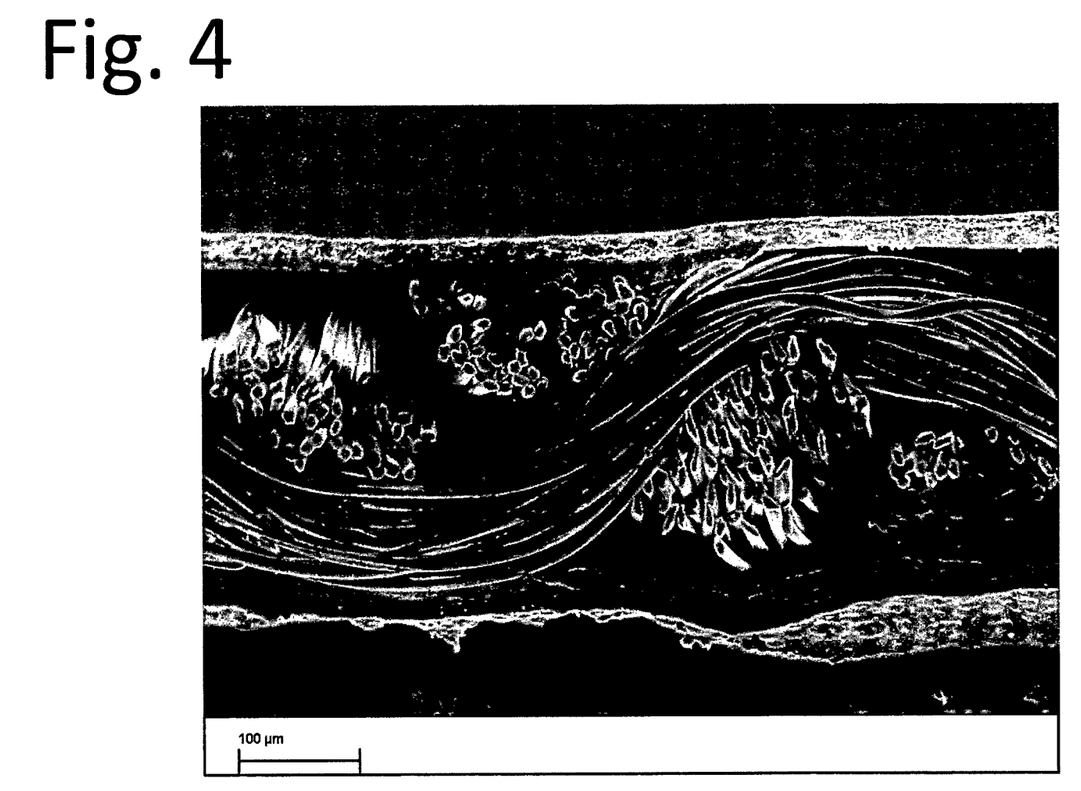
FIG. 4 shows an SEM cross section taken from the laminate according to example 1.

FIG. 4 shows an SEM (scanning electron microscope) cross section taken from the laminate according to example 1.

The resulting three layer laminate had a weight of 250 g/m².

The laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water, and even exceeded 13000 mm liquid water, both in new condition and in damaged condition, indicating the laminate was waterproof. MVTR exceeded 8000 g/(m² 24 h) indicating the laminate was vapor permeable.

The laminate was further tested according to the Edge Wicking Test Protocol (EWTP) and the Water Pick-Up Rate Test Protocol (WPRTP) specified herein.

The results are summarized in Table 1. Water Pickup Rate in new condition was 8 g, but only increased to 16 g in damaged condition. The EWTP resulted in a an increase of weight of only about 1.3% with respect to the weight of the laminate before immersing in water due to wicking of water into the intermediate textile layer.

As a result, the laminate according to example 1 does not take up significant amounts of water, even in damaged conditions, compared to the laminate according to comparative example 1. It appears that the hydrophobic characteristics of the intermediate textile layer yield in the significantly lower tendency to take up water even in a condition where the first functional layer is damaged. However, the laminate according to example 1 remains waterproof even in damaged condition.

Comparative Example 2

A further two layer intermediate laminate was provided which comprises a coated ePTFE membrane made from expanded polytetrafluoroethylene and is coated with a continuous layer of water vapor permeable hydrophilic polyurethane, as described in U.S. Pat. No. 4,194,041. The coated ePTFE membrane forms the first functional layer.

The further two layer intermediate laminate includes a woven textile with a textile weight of 105 g/m² and made of polyester multifilament yarn. The woven textile is laminated to the ePTFE side of the coated ePTFE membrane by gravure printing a dot pattern of moisture curable polyurethane adhesive as described in U.S. Pat. No. 4,532,316. The adhesive printed side of the ePTFE membrane was pressed to one side of the woven textile in a nip role and then passed over a heated roll to form a two layer laminate. The moisture cure adhesive was allowed to cure for 48 hours.

The resulting two layer intermediate laminate had a weight of 147 g/m² and was a water vapor permeable, waterproof laminate.

Furthermore the two layer intermediate laminate was subject to the Spraying Test Protocol specified herein, and the textile side of the laminate showed a spray rate of 0 according to DIN EN ISO 4920(2012).

A further membrane made of ePTFE was laminated to the textile side of the two layer intermediate laminate. The further membrane was a microporous membrane produced from PTFE resin processed into an expanded microporous polytetrafluoroethylene (ePTFE) membrane according to the teaching of U.S. Pat. No. 3,953,566. The membrane was provided with an additional oleophobic coating as taught in U.S. Pat. No. 6,261,678 B1. The membrane had a weight of 19 g/m², a thickness of 30 µm, a density of 0.63 g/cm³ and a mean flow pore diameter of 0.33 µm and a MVTR of 80.000 g/(m² 24 h).

The further membrane was laminated to the textile side of the two layer intermediate laminate by gravure printing a dot pattern of moisture curable polyurethane adhesive as described in U.S. Pat. No. 4,532,316. The adhesive printed side of the further membrane was pressed to the textile side of the two layer intermediate laminate in a nip role and then passed over a heated roll to form a three layer laminate. The moisture cure adhesive was allowed to cure for 48 hours.

The resulting three layer laminate had a weight of 178 g/m².

The three layer laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water, and even exceeded 13000 mm liquid water, both in new condition and in damaged condition, indicating the laminate was waterproof. MVTR exceeded 10500 g/(m² 24 h) indicating the laminate was vapor permeable.

The three layer laminate was further tested according to the Edge Wicking Test Protocol (EWTP) and the Water Pick-Up Rate Test Protocol (WPRTP) specified herein. The results are summarized in Table 1. Water Pickup Rate in new condition was 9 g, but increased to 138 g in damaged condition. The EWTP resulted in a an increase of weight of about 36.6% with respect to the weight of the laminate before immersing in water due to wicking of water into the intermediate textile layer.

Example 2

Another sample of the further two layer intermediate laminate described above with respect to comparative example 2 was provided. The textile side of that sample was rendered hydrophobic by applying a DWR treatment based on a water repellent aqueous base coating of water repellent C6 fluoroacrylate chemical, as described in EP 2 381 031 A1 and available by the company Clariant AG, Germany under the name "Nuva 2114". The further two layer intermediate laminate with the hydrophobic treatment was subject to the Spraying Test Protocol (STP) specified herein. The textile layer rendered hydrophobic showed a sprayrate of 5 according to DIN EN ISO 4920(2012).

The further two layer intermediate laminate with hydrophobic treatment had a weight of 174 g/m².

Such a two layer laminate is commercially available under the name "Venice 2L", article # VENI000000 by W.L. Gore & Associates, Inc. Such a laminate was used as the further intermediate two layer laminate in example 2.

A further membrane made of ePTFE was laminated to the two layer laminate on the side of the textile layer with hydrophobic treatment. The further membrane was a microporous membrane produced from PTFE resin processed into an expanded microporous polytetrafluoroethylene (ePTFE) membrane according to the teaching of U.S. Pat. No. 3,953,566. The membrane was provided with an additional oleophobic coating as taught in U.S. Pat. No. 6,261,678 B1. The further membrane had a weight of 19 g/m², a thickness of 30 µm, a density of 0.63 g/cm³ and a mean flow pore diameter of 0.33 µm and a MVTR of 80.000 g/(m² 24 h).

The further membrane was laminated to the hydrophobic textile side of the further intermediate two layer laminate described above by gravure printing a dot pattern of moisture curable polyurethane adhesive as described in U.S. Pat. No. 4,532,316. The adhesive printed side of the ePTFE membrane was pressed to the textile in a nip role and then passed over a heated roll to form a three layer laminate. The moisture cure adhesive was allowed to cure for 48 hours.

The resulting three layer laminate had a weight of 174 g/m².

The three layer laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water, and even exceeded 13000 mm liquid water, both in new condition and in damaged condition, indicating the laminate was waterproof. MVTR exceeded 10500 g/(m² 24 h) indicating the laminate was vapor permeable.

The laminate was further tested according to the Edge Wicking Test Protocol (EWTP) and the Water Pick-Up Rate Test Protocol (WPRTP) specified herein. The results are summarized in Table 1. Water Pickup Rate in new condition was 8 g, and only increased to 11 g in damaged condition. The EWTP resulted in a an increase of weight of only about 1% with respect to the laminate before immersing in water due to wicking of water into the intermediate textile layer.

As a result, the laminate according to example 2 does not take up significant amounts of water, even in damaged condition, compared to the laminate according to comparative example 2. It appears that the hydrophobic characteristics of the intermediate textile layer yield in the significantly lower tendency to take up water even in a condition where the first functional layer is damaged. However, the laminate according to example 2 remains waterproof.

Comparative Example 3

Comparative example 3 is a two layer laminate according to the teaching of WO 2010/132082 A1.

Such a two layer laminate comprises a knit textile layer comprised of polyester in the form of a flat warp knit having a weight of approximately 37 g/m², from Glen Raven, Inc (Glen Raven, N.C.; part number A1012). The textile layer is attached to a membrane layer of a moisture vapor permeable, microporous PTFE membrane produced from PTFE resin and processed into an expanded polytetrafluoroethylene (ePTFE) membrane according to the teaching of U.S. Pat. No. 5,814,405. The porous membrane and textile were laminated together by gravure printing a dot pattern of moisture curable polyurethane adhesive onto the membrane surface. The adhesive was prepared according to the teachings of U.S. Pat. No. 4,532,316 covering approximately 35% of the membrane surface. The adhesive-printed side of the ePTFE membrane was pressed to one side of the knit textile in a nip roll and then passed over a heating roll to form a two layer laminate. The moisture cure adhesive was allowed to cure for 48 hours. After lamination, the ePTFE membrane surface of the two layer laminate was printed using a red colored, solvent-based, pigment-containing ink capable of wetting the ePTFE.

The colorized, ePTFE outer film surface of the laminate was coated with 2-propanol (Sigma-Aldrich Chemical Corporation, ST Louis, Mo.) so that the film was completely wet. After wetting, it was immediately coated with a fluoropolymer solution, formulated by mixing about 6.0 g of fluorocarbon (AG8025, Asahi Glass, Japan) in about 14.0 g of deionized water. The colorized film surface was hand coated with the mixture using a roller to a coating weight of approximately 3 g/m². The coated film was cured at 180° C. for 2 minutes.

The two layer laminate according to comparative example 3 was subject to the Spraying Test Protocol specified herein. The textile layer of the two layer laminate showed a spray-rate of 0 according to DIN EN ISO 4920(2012).

The two layer laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water in undamaged condition of the two layer laminate. However, once the functional layer of the two layer laminate was damaged as set out in the WPRTP specified herein, water entry pressure was clearly below 8000 mm indicating that the two layer laminate according to comparative example 3 was no longer waterproof. MVTR exceeded 21000 g/(m² 24 h) indicating the laminate was highly vapor permeable.

The laminate was further tested according to the Edge Wicking Test Protocol (EWTP) and the Water Pick-Up Rate Test Protocol (WPRTP) specified herein.

The results are summarized in Table 1. Water Pickup Rate in new condition was 8 g, and increased to 25 g in damaged condition. The EWTP resulted in a an increase of weight of about 11.7% of the weight of the laminate before immersing in water due to wicking of water into the intermediate textile layer. While these values seem to be acceptable with respect to pick up of water by the damaged laminate, the two layer laminate according to comparative example 3 failed to remain waterproof after damages occurred in the functional layer.

Comparative Example 4

The comparative example 4 is a three layer laminate with a flame-resistant (FR) textile sandwiched between two microporous membrane layers, according to the teaching of WO 2010/132082 A1.

The laminate was constructed as follows.

A first moisture vapor permeable, microporous PTFE membrane was produced from PTFE resin and processed into an expanded polytetrafluoroethylene (ePTFE) membrane according to the teaching of U.S. Pat. No. 3,953,566.

A second vapor permeable, microporous PTFE membrane was produced from PTFE resin and processed into an expanded polytetrafluoroethylene (ePTFE) membrane according to the teaching of U.S. Pat. No. 3,953,566.

The flame-resistant textile was a 2/1 twill woven with 235 g/m² made out of staple fiber yarn with the specification Nm 50 (42% cotton 52% modacryl 6% PES) 25 y/cm (warp) and 24 y/cm (weft).

The first membrane was laminated to one side of the woven textile using a polyurethane, hot-melt adhesive in a discrete dot pattern. The adhesive was applied to the first membrane. The first side of the textile was then laminated to the adhesive treated side of the first membrane to form a two layer intermediate laminate.

The two layer intermediate laminate was subject to the Spraying Test Protocol specified herein. As a result, the flame-resistant textile of the intermediate laminate showed a spray rate of 0 according to DIN EN ISO 4920(2012).

The second membrane was laminated to the second side of the flame resistant woven textile (the side opposite the first membrane) by applying the same adhesive to the second membrane and then adhering to the textile side of the two layer laminate previously created. A three layer laminate resulted having a first (outer) functional layer made up from an expanded microporous PTFE membrane and having a second (inner) functional layer also made up from an expanded microporous PTFE membrane. The flame resistant textile layer was sandwiched in between the first and second functional layers which formed the laminate surfaces on the outer and inner sides. The three layer laminate had a weight of 290 g/m².

The three layer laminate was tested for water vapor permeability according to the Moisture Vapor Transmission Rate Test Protocol (MVTR) specified herein and Waterproofness Test Protocol specified herein. MVTR and water entry pressure were determined as indicated in table 1. Water entry pressure exceeded 8000 mm liquid water, and even exceeded 13000 mm liquid water, both in new condition and in damaged condition, indicating the laminate was waterproof. MVTR exceeded 4500 g/(m² 24 h) indicating the laminate was less vapor permeable than the laminates according to the other examples.

The three layer laminate was further tested according to the Edge Wicking Test Protocol (EWTP) and the Water Pick-Up Rate Test Protocol (WPRTP) specified herein. The results are summarized in Table 1. Water Pickup Rate in new condition was 11 g, but increased to 385 g in damaged condition. The EWTP resulted in an increase of weight of about 53.1% with respect to the weight of the laminate before immersing in water due to wicking of water into the intermediate textile layer.

As a result, the laminate according to comparative example 4 remains waterproof in damaged condition of the first functional layer. However, water vapor permeability is worse than for other examples. Most importantly, the laminate according to comparative example 4 takes up significant amounts of water in damaged condition, compared to the laminates according to examples 1 and 2. It appears that the hydrophobic characteristics of the intermediate textile layer in examples 1 and 2 plays an important role in yielding a significantly lower tendency of the laminate to take up water in a condition where the first functional layer is damaged.

TABLE 1

| | Edge Wicking Test Protocol Weight of samples after immersing 5 min in water | | | Water Pick-Up Rate Test Protocol weight of sample after Bundesmann test in [g/m²] | | Spraying Test Protocol Spray Rate DIN EN ISO4920 | Waterproofness Test Protocol according to DIN EN 20 811 Pass: >8000 mm Fail: ≤8000 mm damaged | | Moisture Vapor Transmission Rate Test Protocol MVTR DIM EN ISO 15496 in [g/(m² 24 h)] |
|---|---|---|---|---|---|---|---|---|---|
| | Weight of sample in [g] | Water pick up in [g] | % | new | damaged 30 mm line | | new | 30 mm line | |
| Example 1 | 3 | 0.04 | 1.3 | 8 | 16 | 4 | pass | pass | >8000 |
| Comparative Example 1 | 2.96 | 0.88 | 29.7 | 10 | 242 | 4 | pass | pass | >8000 |
| Example 2 | 2.08 | 0.02 | 1 | 8 | 11 | 3-4 | pass | pass | >10500 |
| Comparative Example 2 | 2.16 | 0.79 | 36.6 | 9 | 138 | 3-4 | pass | pass | >10500 |
| Comparative Example 3 | 1.03 | 0.12 | 11.7 | 8 | 25 | 3 | pass | fail | >21000 |
| Comparative Example 4 | 3.88 | 2.06 | 53.1 | 11 | 385 | 4 | pass | pass | >4500 |

The invention claimed is:

1. A laminate, comprising:
a first functional layer comprising a first water vapor permeable membrane;
a second functional layer comprising a second water vapor permeable membrane; and
a water vapor permeable intermediate textile layer arranged in between the first water vapor permeable membrane and the second water vapor permeable membrane and attached to the first and second functional layers in a water vapor permeable manner;
the intermediate textile layer being hydrophobic,
wherein the intermediate textile layer comprises a hydrophobic coating comprising at least one of a fluoropolymer, a silicone, a polyurethane, a polyolefin, or particles,
wherein the laminate is waterproof and water vapor permeable, and
wherein at least one of the first water vapor permeable membrane and the second water vapor permeable membrane comprises a monolithic layer.

2. The laminate according to claim 1, wherein the laminate has a water pick-up rate according to DIN EN 29 865 of not more than 50 g/m².

3. The laminate according to claim 2, wherein the laminate has a water pick-up rate according to DIN EN 29 865 of not more than 25 g/m².

4. The laminate according to claim 1, wherein the laminate has a water weight gain of not more than 20% when tested according to Edge Wicking Test Protocol (EWTP) comprising the steps of:
1) cutting the laminate into two stripes having a 50 mm width and a 120 mm length;
2) rolling the two stripes so as to form two spiraled cylinders;
3) overlaying the two spiraled cylinders onto each other and clamping longitudinal ends of one side of each of the two spiraled cylinder with a clip of a suspension arrangement of a scale;
4) measuring the weight of the two spiraled cylinders in a dry condition;
5) filling a water reservoir with deionized water;
6) lowering the two spiraled cylinders until free ends thereof are simultaneously immersed in the water;
7) after 5 minutes, measuring the weight of the two spiraled cylinders.

5. The laminate according to claim 4, wherein the laminate has a water weight gain of not more than 10%.

6. The laminate according to claim 1, wherein the intermediate textile layer is selected from a material showing, in a configuration of an intermediate laminate comprising the intermediate textile layer and the first water vapor permeable membrane, but not comprising the second water vapor permeable membrane, a spray rate of 4 or more according to DIN EN ISO 4920.

7. The laminate according to claim 1, wherein the first functional layer is laminated to a first side of the intermediate textile layer via a water vapor permeable adhesive layer and/or the second functional layer is laminated to a second side of the intermediate textile layer via a water vapor permeable adhesive layer.

8. The laminate according to claim 7, wherein the first functional layer is discontinuously bonded to the intermediate textile layer and/or the second functional layer is discontinuously bonded to the intermediate textile layer.

9. The laminate according to claim 1, wherein at least one of the first water vapor permeable membrane and the second water vapor permeable membrane comprises a porous membrane.

10. The laminate according to claim 9, wherein the porous membrane comprises expanded polytetrafluoroethylene (ePTFE).

11. The laminate according to claim 1, wherein the monolithic layer comprises a hydrophilic polymer comprising polyurethane or polyether-polyester.

12. The laminate according to claim 1, wherein the first water vapor permeable membrane has the configuration of a porous membrane and the second water vapor permeable membrane has the configuration of a porous membrane combined with the monolithic layer or provided with a monolithic coating.

13. The laminate according to claim 1, wherein the first water vapor permeable membrane has a mean flow porous size between 0.05 μm and 0.5 μm.

14. The laminate according to claim 1, wherein the laminate has a Moisture Vapor Transmission Rate according to DIN EN ISO 15496 (2004) of at least 3000 g/(m²24 h).

15. The laminate according to claim 1, further comprising at least one further textile layer attached to the second functional layer on the side opposite to the intermediate textile layer.

16. The laminate according to claim 1, wherein the first functional layer is provided with a colorant on the side opposite to the intermediate textile layer.

17. The laminate according to claim 1, wherein the first functional layer is provided with an additional monolithic and/or hydrophobic coating on the outer surface.

18. A garment comprising the laminate according to claim 1.

19. A laminate, comprising:
- an outer functional layer comprising a first water vapor permeable microporous ePTFE membrane;
- an inner functional layer comprising a second water vapor permeable microporous ePTFE membrane; and
- a water vapor permeable intermediate textile layer arranged in between the first water vapor permeable microporous ePTFE membrane and the second water vapor permeable microporous ePTFE membrane and attached to the first and second water vapor permeable microporous ePTFE membranes in a water vapor permeable manner;
- the intermediate textile layer being hydrophobic,
- wherein the intermediate textile layer comprises a hydrophobic coating comprising at least one of a fluoropolymer, a silicone, a polyurethane, a polyolefin, and particles,
- wherein the laminate is waterproof and water vapor permeable, and
- wherein at least one of the first water vapor permeable microporous ePTFE membrane and the second water vapor permeable microporous ePTFE membrane comprises a monolithic layer.

20. A garment comprising the laminate according to claim 19.

21. The garment according to claim 20, wherein the garment is any of outerwear, underwear, footwear, glove, headwear, and accessories.

22. The garment according to claim 20, wherein the outer functional layer forms the outermost side of the garment.

* * * * *